United States Patent
Nose et al.

(10) Patent No.: US 8,146,794 B2
(45) Date of Patent: Apr. 3, 2012

(54) BOOM AND ARM MEMBER OF CONSTRUCTION MACHINE EXCELLENT IN WELD ZONE FATIGUE STRENGTH AND METHOD OF IMPROVEMENT OF ITS FATIGUE STRENGTH

(75) Inventors: Tetsuro Nose, Futtsu (JP); Kiyotaka Nakashima, Oita (JP)

(73) Assignee: Nippon Steel Corporation, Tokyo (JP)

( * ) Notice: Subject to any disclaimer, the term of this patent is extended or adjusted under 35 U.S.C. 154(b) by 1086 days.

(21) Appl. No.: 11/631,100

(22) PCT Filed: Jul. 14, 2005

(86) PCT No.: PCT/JP2005/013431
§ 371 (c)(1),
(2), (4) Date: Dec. 28, 2006

(87) PCT Pub. No.: WO2006/006738
PCT Pub. Date: Jan. 19, 2006

(65) Prior Publication Data
US 2008/0292443 A1 Nov. 27, 2008

(30) Foreign Application Priority Data
Jul. 15, 2004 (JP) ................................ 2004-208329

(51) Int. Cl.
*B23K 20/00* (2006.01)
(52) U.S. Cl. ............ 228/110.1; 52/116; 52/117; 52/119
(58) Field of Classification Search .................. 52/111, 52/116, 117–120, 843, 845, 846, 838, 745.04, 52/847; 228/165, 166, 110.1, 1.1, 2.1, 112.1, 228/115, 116, 45; 148/558; 29/845, 843; 156/73.5, 73.6
See application file for complete search history.

(56) References Cited

U.S. PATENT DOCUMENTS

| | | | | |
|---|---|---|---|---|
| 1,554,546 A * | 9/1925 | Austin | ............. | 219/55 |
| 1,688,360 A * | 10/1928 | Steigerwald | ............. | 219/55 |
| 1,784,866 A * | 12/1930 | Fahrenwald | ............. | 72/376 |
| 2,487,860 A * | 11/1949 | Enos | ............. | 29/889.6 |
| 2,684,159 A * | 7/1954 | Oldenkamp | ............. | 52/115 |
| 2,710,443 A * | 6/1955 | Webb | ............. | 29/890.043 |

(Continued)

FOREIGN PATENT DOCUMENTS
JP    10-85934 A    4/1998
(Continued)

OTHER PUBLICATIONS

Supplementary European Search Report dated Mar. 23, 2009 issued in corresponding European Application No. 05 76 6177.

*Primary Examiner* — Phi Dieu Tran A
(74) *Attorney, Agent, or Firm* — Kenyon & Kenyon LLP

(57) ABSTRACT

The present invention provides a boom and arm member of a construction machine excellent in weld zone fatigue strength and a method of improvement of its fatigue strength, that is, a boom and arm member of a construction machine superior in weld zone fatigue strength, the boom and arm member of a construction machine characterized in that toes of full penetrated weld zones of the boom and arm member have vibration strike marks, and a method of improvement of its fatigue strength. Preferably, the residual stress of the bottom surface of the vibration strike marks is a 10 MPa or higher compressive residual stress.

10 Claims, 5 Drawing Sheets

U.S. PATENT DOCUMENTS

| | | | | |
|---|---|---|---|---|
| 3,120,400 | A | * | 2/1964 | Carpenter ................... 285/124.2 |
| 3,423,890 | A | * | 1/1969 | Leigh ............................ 52/118 |
| 4,016,688 | A | * | 4/1977 | Tiffin et al. .................... 52/118 |
| 4,036,372 | A | | 7/1977 | Rao et al. ...................... 212/230 |
| 4,049,186 | A | * | 9/1977 | Hanneman et al. ........... 228/225 |
| 4,107,505 | A | * | 8/1978 | Eftefield .................... 219/76.14 |
| 4,112,649 | A | * | 9/1978 | Fritsch et al. .................. 52/843 |
| 4,136,811 | A | * | 1/1979 | Sato .............................. 228/165 |
| 4,153,167 | A | * | 5/1979 | Gill ............................... 414/694 |
| 4,156,331 | A | * | 5/1979 | Lester et al. .................... 52/115 |
| 4,170,854 | A | * | 10/1979 | Palmcrantz et al. ............ 52/115 |
| 4,171,598 | A | * | 10/1979 | Holmes .......................... 52/118 |
| 4,175,907 | A | * | 11/1979 | Knell et al. ................... 414/715 |
| 4,185,945 | A | * | 1/1980 | Gill ............................... 414/727 |
| 4,214,923 | A | * | 7/1980 | Price .............................. 148/529 |
| 4,217,987 | A | * | 8/1980 | Gattu et al. ................... 212/299 |
| 4,224,003 | A | * | 9/1980 | St. Louis ..................... 404/133.2 |
| 4,244,532 | A | * | 1/1981 | Kroening et al. ............. 241/264 |
| 4,292,782 | A | * | 10/1981 | Schaeffer ........................ 52/696 |
| 4,297,815 | A | * | 11/1981 | Moro et al. ..................... 52/115 |
| 4,337,601 | A | * | 7/1982 | Vaerk et al. .................... 52/118 |
| 4,459,786 | A | * | 7/1984 | Pitman et al. .................. 52/115 |
| 4,693,747 | A | * | 9/1987 | Bretz et al. .................... 75/249 |
| 4,715,524 | A | * | 12/1987 | Fukaya et al. ................. 228/165 |
| RE32,892 | E | * | 3/1989 | Simons .................. 219/137 WM |
| 4,896,814 | A | * | 1/1990 | Allain et al. .................. 228/119 |
| 4,945,705 | A | * | 8/1990 | Rump et al. ................... 52/843 |
| 5,035,142 | A | * | 7/1991 | Dryga et al. .................. 148/509 |
| 5,167,728 | A | * | 12/1992 | Weber ........................... 148/514 |
| 5,233,149 | A | * | 8/1993 | Killian et al. ............... 219/76.12 |
| 5,722,896 | A | * | 3/1998 | Beagley et al. ............... 464/180 |
| 5,778,813 | A | * | 7/1998 | Kennedy ..................... 114/74 A |
| 5,948,286 | A | * | 9/1999 | Chalco et al. ............ 219/121.63 |
| 5,976,314 | A | * | 11/1999 | Sans .......................... 156/580.1 |
| 6,050,208 | A | * | 4/2000 | Kennedy ..................... 114/74 A |
| 6,050,900 | A | * | 4/2000 | Reinhardt et al. ............. 464/180 |
| 6,168,067 | B1 | * | 1/2001 | Waldron et al. ............ 228/112.1 |
| 6,336,583 | B1 | * | 1/2002 | Wang et al. ................... 228/175 |
| 6,338,765 | B1 | * | 1/2002 | Statnikov ....................... 148/558 |
| 6,398,883 | B1 | * | 6/2002 | Forrest et al. ................. 148/516 |
| 6,510,975 | B2 | * | 1/2003 | Enomoto ................... 228/112.1 |
| 6,543,671 | B2 | * | 4/2003 | Hatten et al. .............. 228/112.1 |
| 6,585,148 | B2 | * | 7/2003 | Aono et al. ................ 228/112.1 |
| 6,630,249 | B2 | * | 10/2003 | Kennedy ....................... 428/625 |
| 6,706,406 | B1 | * | 3/2004 | Kennedy ..................... 428/423.1 |
| 6,722,175 | B2 | * | 4/2004 | Statnikov ......................... 72/53 |
| 6,840,426 | B2 | * | 1/2005 | Aota et al. ................. 228/112.1 |
| 6,844,522 | B1 | * | 1/2005 | Wang et al. ............. 219/121.64 |
| 6,889,889 | B2 | * | 5/2005 | Offer et al. .................... 228/119 |
| 6,926,970 | B2 | * | 8/2005 | James et al. .................. 428/615 |
| 6,984,452 | B2 | * | 1/2006 | Kennedy ..................... 428/423.1 |
| 6,993,948 | B2 | * | 2/2006 | Offer .............................. 72/53 |
| 6,994,916 | B2 | * | 2/2006 | Forrest et al. ................. 428/594 |
| 7,051,917 | B2 | * | 5/2006 | Simmons ...................... 228/165 |
| 7,268,421 | B1 | * | 9/2007 | Lin ................................ 257/690 |
| 7,344,609 | B2 | * | 3/2008 | Statnikov ...................... 148/558 |
| 7,354,657 | B2 | * | 4/2008 | Mishra .......................... 428/596 |
| 7,857,918 | B2 | * | 12/2010 | Ishikawa et al. .............. 148/558 |
| 2003/0085257 | A1 | * | 5/2003 | James et al. ................ 228/112.1 |

FOREIGN PATENT DOCUMENTS

| | | |
|---|---|---|
| JP | 2000-248573 A | 9/2000 |
| JP | 2003-1476 | 1/2003 |
| JP | 2003-113418 | 4/2003 |
| JP | 2003-290972 A | 10/2003 |
| JP | 2004-130313 | 4/2004 |
| JP | 2004-130315 A | 4/2004 |
| JP | 2004-149843 A | 5/2004 |
| WO | WO 2004/046394 | 6/2004 |

* cited by examiner

BOOM AND ARM MEMBER OF CONSTRUCTION MACHINE EXCELLENT IN WELD ZONE FATIGUE STRENGTH AND METHOD OF IMPROVEMENT OF ITS FATIGUE STRENGTH

TECHNICAL FIELD

The present invention relates to a boom and arm member of a construction machine excellent in weld zone fatigue strength and a method of improvement of its fatigue strength.

BACKGROUND ART

The boom and arm member of an excavator or other construction machine is constantly subjected to repeated load. It is therefore necessary to give sufficient consideration to the safety of weld zones against fatigue during operation of the construction machine.

In general, the fatigue strength of a weld zone is remarkably lower than the fatigue strength of the matrix material. The main reasons are known to be of the stress concentration at the weld toe, the formation of tensile residual stress sites at the weld toe, and the growth of the crystal grains of the weld heat affected zone.

As measures against this, in the past the method of grinding the weld zones to prevent the concentration of stress at the weld zones and the method of placing the welded boom and arm member in a heat treatment furnace for post-heat treatment in so-called "SR treatment" to reduce the tensile residual stress on the weld zones have been used.

However, grinding has the problem of poor work efficiency and further of its effect being largely governed by the skill of the operator, e.g., with over grinding of the weld zones resulting in a reduction in the joint strength.

Further, SR treatment has the problem that it requires a large sized heat treatment furnace and involves tremendous capital costs and operating costs.

Further, Japanese Patent Publication (A) No. 2003-113418 proposes the method of pretreating locations of a metal material where fatigue would become a problem, then treating it by ultrasonic shock waves and further then inspecting it for quality assurance so as to improve the fatigue life of the metal material and discloses that ultrasonic shock wave treatment causes the weld toes to deform with curvature and the degree of stress concentration to change.

Further, Japanese Patent Publication (A) No. 2004-130313 proposes a method of improving the fatigue strength by striking the vicinity of the top parts of weld toes of fillet weld joints, where two overlapping ends are welded together, by an ultrasonic vibration terminal.

However, in these proposals, the case of applying ultrasonic striking treatment to the boom and arm of a construction machine and the conditions for the same were not studied.

DISCLOSURE OF THE INVENTION

The present invention solves the above-mentioned problem of the prior art and has as its object the provision of a boom and arm member of a construction machine excellent in weld zone fatigue strength and a method of improvement of its fatigue strength.

The present invention was made as a result of in-depth studies to achieve the above object and provides a boom and arm member of a construction machine excellent in weld zone fatigue strength providing the toes of full penetrated weld zones of a boom and arm member of a construction machine with vibration strike marks by a vibration terminal and a method of improvement of its fatigue strength and has as its gist the following content as described in the claim section:

(1) A boom and arm member of a construction machine excellent in weld zone fatigue strength, the boom and arm member of construction machine characterized by having vibration strike marks at toes of full penetrated weld zones of the boom and arm member.

(2) A boom and arm member of construction machine excellent in weld zone fatigue strength as set forth in (1), characterized in that the residual stress of the bottom surface of the vibration strike marks is made a 10 MPa or more compressive residual stress.

(3) A boom and arm member of construction machine excellent in weld zone fatigue strength as set forth in (1) or (2), characterized in that the bottom surface of the vibration strike marks has a crystal grain size of the steel material of 5 μm or less.

(4) A boom and arm member of construction machine excellent in weld zone fatigue strength as set forth in any one of (1) to (3), characterized in that the toes of full penetrated weld zones are toes of steel plate weld zones of top plates, side plates, and bottom plates forming the boom and arm, toes of steel plate weld zones of reinforcing partition steel plates and the boom and arm in the boom and arm, toes of steel plate weld zones with bearing part cast brackets, and/or toes of the weld zones of the parts of the bucket, arm, and boom to which two ends of cylinders are fastened.

(5) A method of improvement of boom and arm fatigue strength of a construction machine, the method of improvement of boom and arm member fatigue strength of a construction machine characterized by applying vibration striking treatment to toes of full penetrated weld zones of a boom and arm of a construction machine.

(6) A method of improvement of boom and arm fatigue strength of a construction machine as set forth in (5), characterized in that the toes of full penetrated weld zones toes of steel plate weld zones of top plates, side plates, and bottom plates forming the boom and arm, toes of steel plate weld zones of reinforcing partition steel plates and the boom and arm in the boom and arm, toes of steel plate weld zones with bearing part cast brackets, and/or toes of the weld zones of the parts of the bucket, arm, and boom to which two ends of cylinders are fastened.

(7) A method of improvement of boom and arm fatigue strength of a construction machine as set forth in (5) or (6), characterized in that the conditions of the vibration striking treatment are use of a vibration terminal made to vibrate by a 10 Hz to 50 kHz frequency for vibration striking by a 0.01 to 4 kW work rate.

(8) A method of improvement of boom and arm fatigue strength of a construction machine as set forth in (7), characterized in that the vibration terminal is rod shaped and a front end of the rod has a cross-sectional area of 0.01 mm$^2$ to 100 mm$^2$.

BEST MODE FOR WORKING THE INVENTION

Embodiments of the present invention will be explained in detailed using FIG. 1 to FIG. 8.

Figure 1:
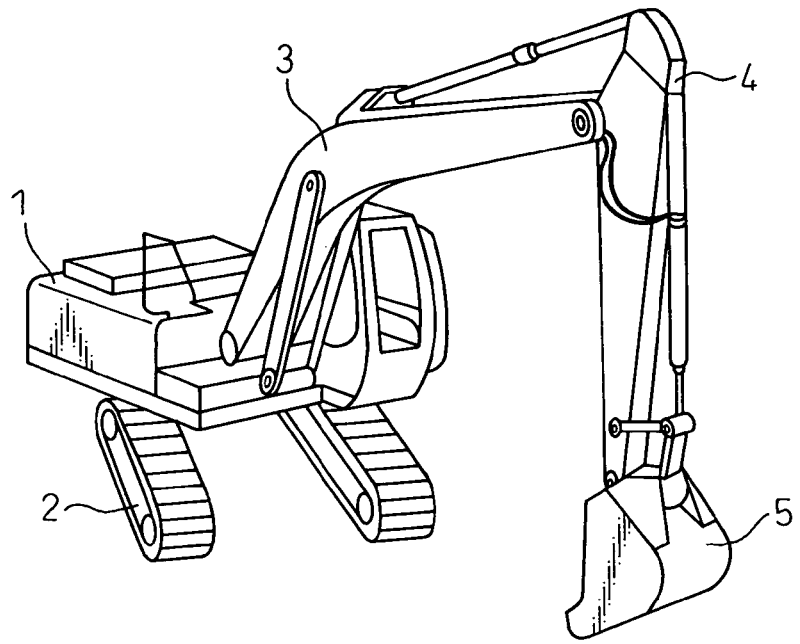
FIG. 1 is an overall schematic view of an excavator shown as an example of a construction machine covered by the present invention by a perspective view.
Figure 2:
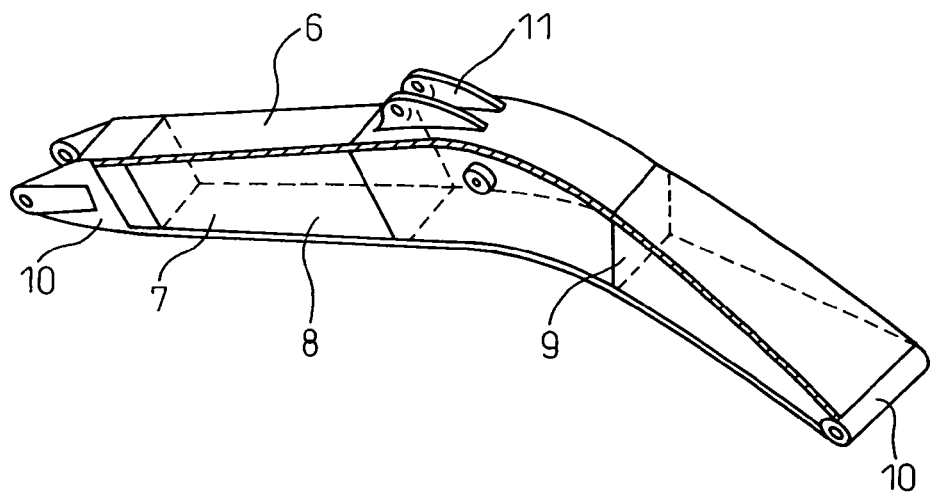
FIG. 2 is a view schematically showing the structure of a boom covered by the present invention by a perspective view.
Figure 3:
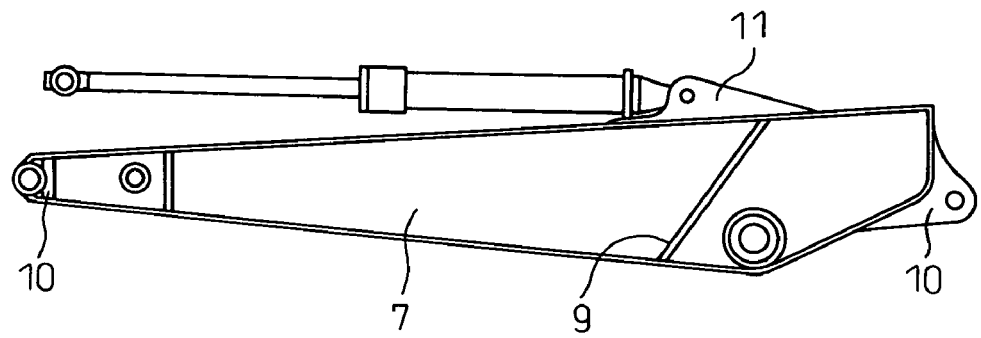
FIG. 3 is a view schematically showing an arm covered by the present invention by a side view.

FIG. 1 to FIG. 3 are views illustrating a boom and arm of a construction machine covered by the present invention. FIG. 1 is an overall schematic view of an excavator shown as an example of a construction machine by a perspective view, wherein 1 indicates a cab, 2 a crawler, 3 a boom, 4 an arm, and 5 a bucket. Each time an excavator performs work such as digging up and transporting earth on a construction site, the boom 3 or arm 4 is acted on by a repeated load comprised of an axial force and bending force and the weld zones sometimes crack causing fatigue damage.

Figure 6:
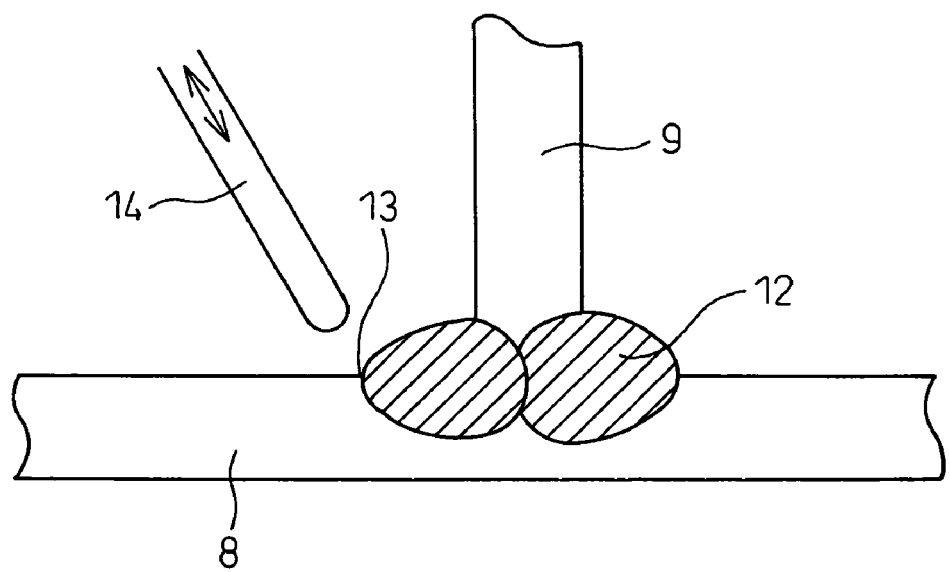
FIG. 6 is a view schematically showing still another example of a weld zone of a boom and arm to which the present invention is applied.

FIG. 2 is a perspective view of the structure of a boom, while FIG. 3 schematically shows the structure of the arm by a side view. In FIG. 2 and FIG. 3, 6 indicates a top plate, 7 a side plate, 8 a bottom plate, 9 a reinforcing partition plate, 10 a bearing part cast bracket, and 11 a cylinder fastening part. As shown in FIG. 2 and FIG. 3, the boom and arm have box structures. In cross-section, they form rectangular closed cross-sectional structures resistant to not only deformation in the axial direction but also bending deformation.

Figure 4:
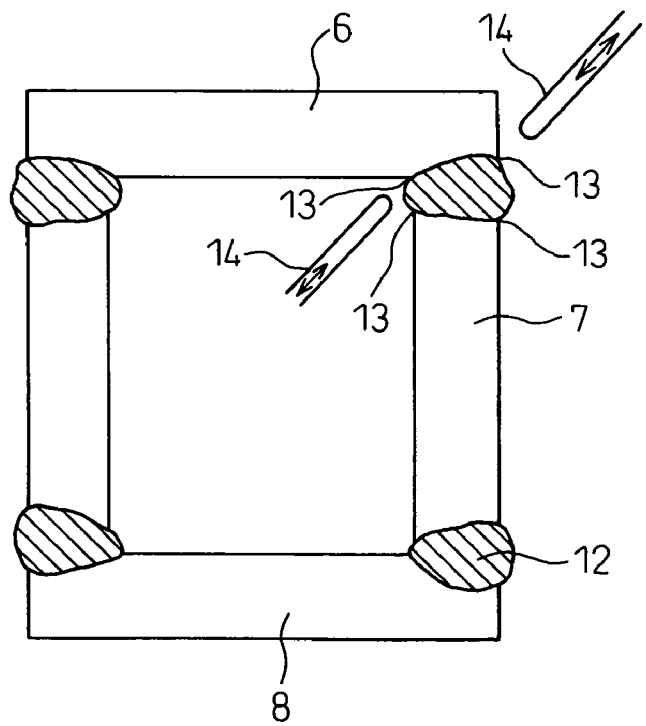
FIG. 4 is a view schematically showing an example of a weld zone of a boom and arm to which the present invention is applied.

FIG. 4 is a view illustrating the cross-section of a boom and arm member of the present invention. In FIG. 4, 6 indicates a top plate, 7 a side plate, 8 a bottom plate, 12 a weld metal, 13 a stop part, and 14 a vibration terminal.

The present invention is a boom and arm member of a construction machine characterized by having vibration strike marks at stop parts of full penetrated weld zones of the boom and arm member.

As shown in FIG. 4, the present invention strikes the toes of full penetrated weld zones 13 by a vibration terminal 14 to impart vibration strike marks to toes 13 most susceptible to stress concentration and convert the residual stress of the toes 13 to compressive residual stress and thereby improve the weld zone fatigue strength.

Here, a "full penetrated weld zone", as shown in FIG. 4, means a weld zone where the weld metal 12 spans the entire thickness direction of a steel plate being welded.

In the present invention, the weld zones for the vibration striking treatment are limited to full penetrated weld zones because if not full penetrated welds, unwelded parts will remain at the weld locations of the weld material, stress concentration will occur at the front ends of the unwelded parts (root parts), and fatigue cracks will easily occur and propagate from the root parts. Further, the root parts end up being buried inside the weld zones, so even if applying vibration striking treatment from the outside, it is not possible to change the residual stress of the front regions of the root parts from tensile to compressive stress.

Further, to improve the weld zone fatigue strength, the residual stress of the bottom surfaces of the vibration strike marks is preferably made a 10 MPa or more compressive residual stress.

Note that in the present invention, the materials of the boom and arm are not critical, but since they are frequently used for construction machines, SS400, SM400, SM490, SM570, and other structural steels are preferable.

Figure 5:
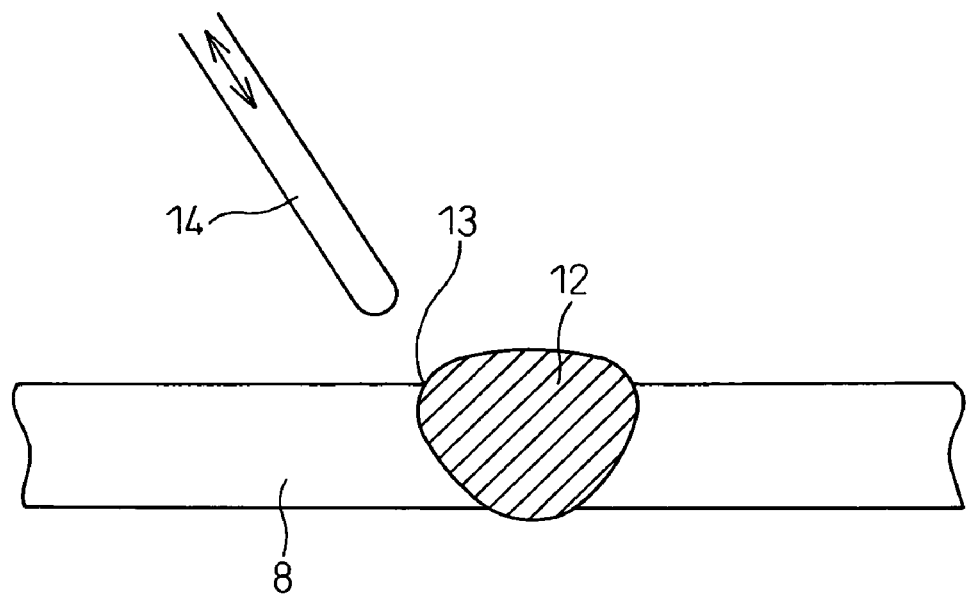
FIG. 5 is a view schematically showing another example of a weld zone of a boom and arm to which the present invention is applied.
Figure 8:
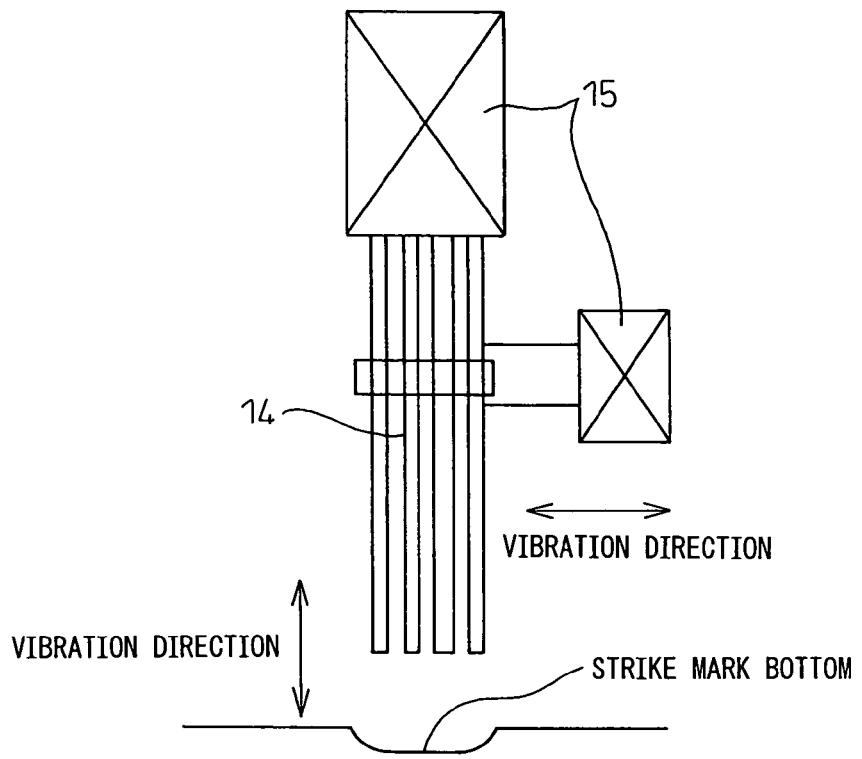
FIG. 8 is a view illustrating a vibration terminal used in the present invention.

FIG. 5 and FIG. 6 are views schematically showing typical examples of the weld zones of a boom and arm to which the present invention is applied by cross-sectional views. In FIG. 5 and FIG. 6, 8 indicates a bottom plate, 9 a reinforcing partition plate, 12 a weld metal, 13 a toes, and 14 a vibration terminal. FIG. 5 indicates the case of butt welding bottom plates 8, while FIG. 6 indicates the case of T-welding a bottom plate 8 and reinforcing partition plate 9.

In this way, the weld toe to which the present invention is applied, as explained above, should be a full penetrated weld zone. It may be any of toes of steel plate weld zones of top plates, side plates, and bottom plates forming the boom and arm, toes of steel plate weld zones of reinforcing partition steel plates and the boom and arm in the boom and arm, toes of steel plate weld zones with bearing part cast brackets, and/or toes of the weld zones of the parts of the bucket, arm, and boom to which two ends of cylinders are fastened.

Figure 7:
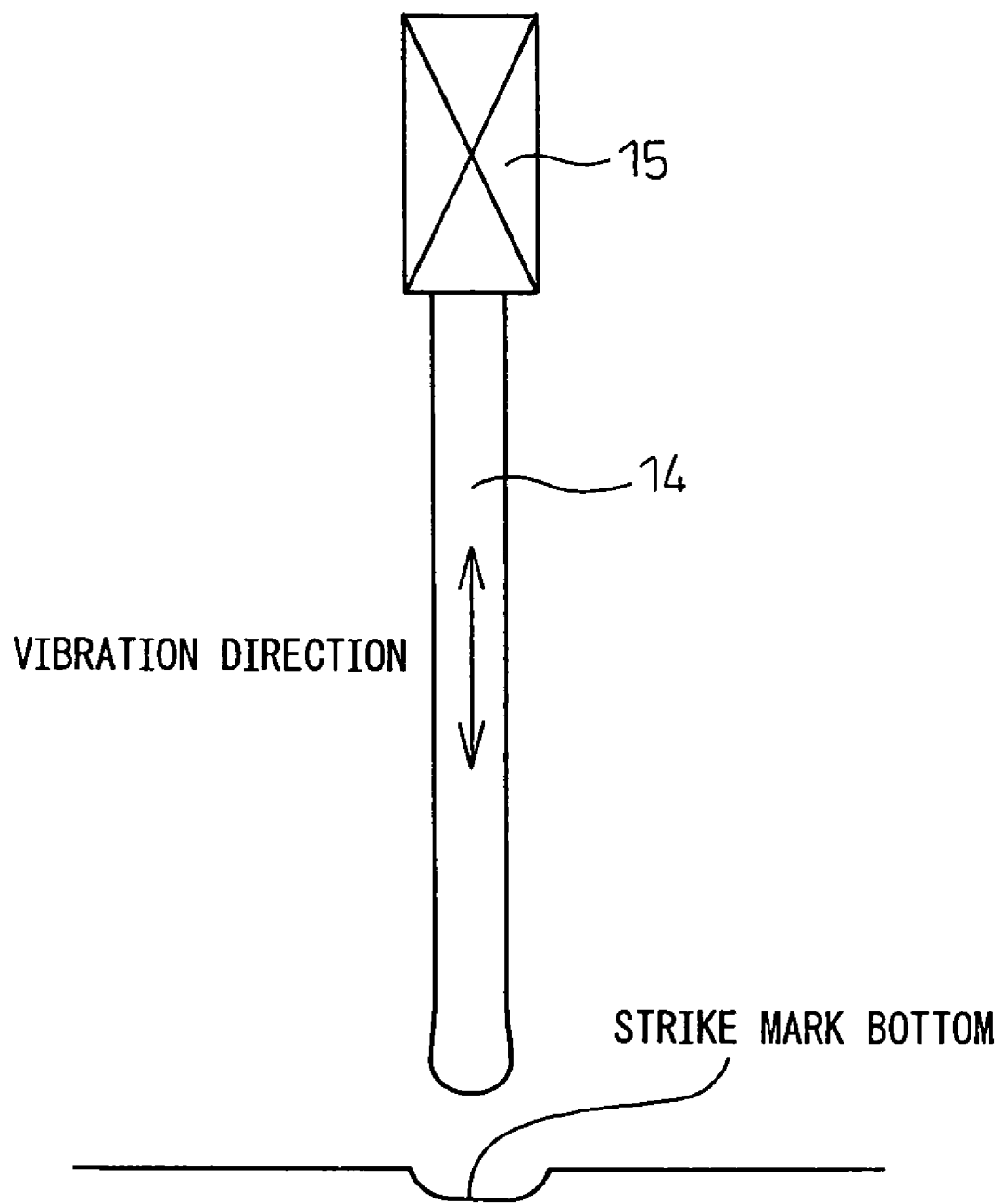
FIG. 7 is a view illustrating a vibration terminal used in the present invention.

FIG. 7 and FIG. 8 are a view illustrating a vibration terminal used in the present invention. In FIG. 7, 14 indicates a vibration terminal, and 15 a vibrator. First, as shown in FIG. 7, the surface of the weld toe is struck by the vibration terminal 14.

Preferably the vibrator 15 is used to make the front end of the vibration terminal 14 vibrate and apply vibration striking to the surface of the weld toe at a 10 Hz to 50 kHz frequency by a 0.01 to 4 kW work rate.

By applying vibration striking at a 10 Hz to 50 kHz frequency and a 0.01 to 4 kW work rate, it is possible to make the residual stress of the bottom surface of the vibration strike marks a 10 MPa or more compressive residual stress and possible to make the crystal grain size of the steel material 5 μm or less.

The mechanism by which striking a weld toe at its surface causes the residual stress to become compressive residual stress is that using a vibration terminal 14 made to vibrate at a 10 Hz to 50 kHz frequency to strike it by a 0.01 to 4 kW work rate causes the toe to plastically flow at its surface to form strike marks along with that form sites for compressive residual stress near the surface.

Further, the mechanism by which the crystal grains are made finer is believed to be that using the vibration terminal 14; made to vibrate at a 10 Hz to 50 kHz frequency, strike the surface by a 0.01 to 4 kW work rate causes the surface of the toe to generate work heat and that repeated striking in an insulated state where this work heat cannot escape causes the same effect as with hot forging.

The reason for limitation of the frequency of the vibration terminal 14 to 10 Hz or more is that if less than 10 Hz, the insulating effect of the heat due to the striking cannot be obtained, while the reason for limitation to a frequency of not more than 50 kHz is that the ultrasonic waves or other frequency obtained by a vibrator able to be used industrially is generally not more than 50 kHz.

The work rate of the vibration terminal 14 is made 0.01 kW or more because if less than 0.01 kW, the treatment time required for the striking treatment becomes too long. It is made not more than 4 kW because even if striking the surface with a work rate over this, the effect is saturated, so the economic advantage falls.

Further, the vibration terminal 14 is a rod shape as shown in FIG. 7. If the cross-sectional area by which the front end of the rod contacts the subject metal product is too small, the treatment time becomes long, while if the cross-sectional area is too large, the effect of increasing the grain fineness is not sufficient, so the cross-sectional area is preferably made 0.01 mm$^2$ to 100 mm$^2$.

Note that in the embodiment shown in FIG. 7, there is a single vibration terminal 14, but as shown in FIG. 8, a plurality of vibration terminals may also be provided.

In the embodiment of FIG. 8, a plurality of vibration terminals 14 are used bundled together and the bundled vibration terminals 14 as a whole are made to vibrate simultaneously in the vertical direction and the horizontal direction.

For this purpose, a plurality of vibrators 15 are provided to cause vibration in each of the vertical direction and horizontal direction.

By making the vibration terminal 14 simultaneously vibrate vertically and horizontally and strike the surface of the weld toe in this way, formation of texture is suppressed and the crystal grains can be made equiaxial, so the surface layer part can be made finer in crystal structure.

Note that vibration terminal 14 may be a single terminal made to vibrate vertically and horizontally. Further, instead of horizontal vibration, the vibration terminal may be made to rotate or rock to obtain similar effects.

EXAMPLES

Figure 9:
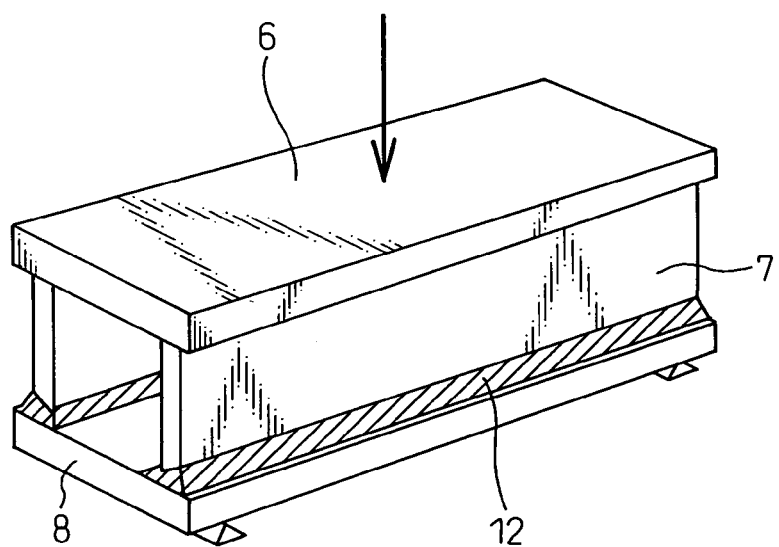
FIG. 9 is a view showing a box shaped test member corresponding to a boom and arm of a construction machine.

A SS400 box-shaped test member shown in FIG. 9, corresponding to a boom or arm of a construction machine, was treated by the method of improvement of fatigue strength of the present invention. The results are shown below. In FIG. 9, 6 indicates a top plate, 7 a side plate, 8 a bottom plate, and 12 a weld metal. As shown in FIG. 9, the toes of the weld metal 12 were treated by vibration striking using the afore-mentioned single vibration terminal. The X-ray Sin 2ψ method was used to measure the residual stress of the bottom of the strike marks, whereupon the residual stress in the direction parallel to the weld bead was −251 MPa to −431 MPa and the residual stress in the direction vertical to the weld bead was −85 MPa to −286 MPa—in each case compressive residual stress.

Further, the bottom surface of the vibration strike marks had an average value of the crystal grain size of the steel material of 1.0 μm.

Next, as shown in FIG. 9, repeated load was applied in the arrow direction, whereupon the fatigue strength (fatigue limit), which was about 50 MPa as welded, i.e., before vibration striking treatment, became about 110 MPa after vibration striking treatment at the weld toes at both the outer surface and inner surface of the box. This suggests that by applying the present invention, the boom and arm of a construction machine can be improved in fatigue strength two times or more.

This remarkable improvement in fatigue strength due to vibration striking treatment is believed to be because the residual stress of the weld toes becomes large compressive residual stress and the formation of strike marks causes the weld toes to increase in radius of curvature and the stress concentration to decrease, whereby the drive force behind the formation and propagation of fatigue cracks due to repeated load is reduced, and further because the structure of the surface of the areas of stress concentration of the weld toes susceptible to fatigue cracks becomes finer and the resistance to cracking rises.

INDUSTRIAL APPLICABILITY

According to the present invention, it is possible to provide a boom and arm member of a construction machine superior in weld zone fatigue strength and a method of improvement of its fatigue strength by providing the toes of full penetrated weld zones of a boom and arm member of a construction machine with vibration strike marks by a vibration terminal.

The invention claimed is:

1. A boom and arm member of a construction machine excellent in weld zone fatigue strength, said boom and arm member of construction machine characterized by having full penetrated weld zones and having vibration strike marks at toes of said full penetrated weld zones of said boom and arm member, wherein said vibration strike marks are formed by a vibration terminal made to vibrate in a vertical direction and a horizontal direction by different vibrators.

2. A boom and arm member of construction machine excellent in weld zone fatigue strength as set forth in claim 1, characterized in that a residual stress of the bottom surface of the vibration strike marks is made a 10 MPa or more compressive residual stress.

3. A boom and arm member of construction machine excellent in weld zone fatigue strength as set forth in claim 1, characterized in that said bottom surface of the vibration strike marks has a crystal grain size of the steel material of 5 μm or less.

4. A boom and arm member of construction machine excellent in weld zone fatigue strength as set forth in claim 1, characterized in that said toes of said full penetrated weld zones are toes of steel plate weld zones of top plates, side plates, and bottom plates forming said boom and arm, toes of steel plate weld zones of reinforcing partition steel plates and the boom and arm in the boom and arm, toes of steel plate weld zones with bearing part cast brackets, and/or toes of the weld zones of the parts of the bucket, arm, and boom to which two ends of cylinders are fastened.

5. A method of improvement of boom and arm fatigue strength of a construction machine, said method of improvement of boom and arm member fatigue strength of a construction machine characterized by providing full penetrated weld zones in a boom and arm member of said construction machine, and applying vibration striking treatment by a vibration terminal made to vibrate in a vertical direction and a horizontal direction by different vibrators to toes of said full penetrated weld zones of said boom and arm member of said construction machine.

6. A method of improvement of boom and arm fatigue strength of a construction machine as set forth in claim 5, characterized in that said toes of said full penetrated weld zones are toes of steel plate weld zones of top plates, side plates, and bottom plates forming said boom and arm, toes of steel plate weld zones of reinforcing partition steel plates and the boom and arm in the boom and arm, toes of steel plate weld zones with bearing part cast brackets, and/or toes of the weld zones of the parts of the bucket, arm, and boom to which two ends of cylinders are fastened.

7. A method of improvement of boom and arm fatigue strength of a construction machine as set forth in claim 5, characterized in that said vibration striking treatment is carried out by a vibration terminal made to vibrate at a 10 Hz to 50 kHz frequency for vibration striking at a 0.01 to 4 kW work rate.

8. A method of improvement of boom and arm fatigue strength of a construction machine as set forth in claim 7, characterized in that said vibration terminal is rod shaped and a front end of the rod has a cross-sectional area of 0.01 mm$^2$ to 100 mm$^2$.

9. A boom and arm member of construction machine excellent in weld zone fatigue strength as set forth in claim 1, wherein in surface layer of said toe of said full penetrated weld zone, formation of texture is suppressed and crystal grains are made equiaxial.

10. A method of improvement of boom and arm fatigue strength of a construction machine as set forth in claim 5, wherein said vibration striking treatment suppresses formation of texture and making crystal grains equiaxial in surface layer of said toe of said full penetrated weld zone.

* * * * *